US009184554B2

(12) United States Patent
Qiao (10) Patent No.: US 9,184,554 B2
(45) Date of Patent: Nov. 10, 2015

(54) REDUCING THERMAL DEPENDENCE OF AMPLIFIER GAIN (71) Applicant: Lijie Qiao, Ottawa (CA)

(72) Inventor: Lijie Qiao, Ottawa (CA)

(73) Assignee: Lijie Qiao, Ottawa (CA)

( * ) Notice: Subject to any disclaimer, the term of this patent is extended or adjusted under 35 U.S.C. 154(b) by 0 days.

(21) Appl. No.: 14/469,661

(22) Filed: Aug. 27, 2014

(65) Prior Publication Data

US 2015/0062692 A1    Mar. 5, 2015

Related U.S. Application Data (60) Provisional application No. 61/870,248, filed on Aug. 27, 2013.

(51) Int. Cl.
*H01S 3/067* (2006.01)
*H01S 3/13* (2006.01)
*H01S 3/131* (2006.01)
*H04B 10/2507* (2013.01)

(52) U.S. Cl.
CPC ............ *H01S 3/1317* (2013.01); *H01S 3/1302* (2013.01); *H01S 3/06754* (2013.01)

(58) Field of Classification Search
CPC .................... H01S 3/1302; H01S 3/06754
See application file for complete search history.

(56) References Cited

U.S. PATENT DOCUMENTS

| | | | |
|---|---|---|---|
| 6,049,414 A * | 4/2000 | Espindola et al. ............ 359/337 |
| 6,535,329 B1 | 3/2003 | Pelard et al. ................. 359/337 |
| 6,643,431 B2 * | 11/2003 | Hatayama et al. ............. 385/39 |
| 6,728,434 B2 | 4/2004 | Flanders ......................... 385/18 |
| 7,724,354 B2 * | 5/2010 | Drodofsky et al. .......... 356/5.01 |
| 2002/0109907 A1 | 8/2002 | Chen et al. .................... 359/337 |
| 2009/0201576 A1* | 8/2009 | Bolshtyansky et al. .. 359/341.33 |

FOREIGN PATENT DOCUMENTS

| | | | | |
|---|---|---|---|---|
| EP | 1111743 A2 | 6/2001 | ............. H01S 3/131 |
| EP | 1246322 A2 | 10/2002 | ............. H01S 3/067 |

* cited by examiner

*Primary Examiner* — Eric Bolda
(74) *Attorney, Agent, or Firm* — Teitelbaum & MacLean; Neil Teitelbaum; Doug MacLean (57) ABSTRACT

Devices and methods for lessening a thermal dependence of gain profile of an optical amplifier are disclosed. An optical beam is split in two sub-beams with a thermally variable power splitting ratio. One sub-beam travels a longer optical path length than the other. When the two sub-beams are recombined, they interfere with each other, causing the throughput to be wavelength dependent. An amplitude of this wavelength dependence is thermally variable due to the thermally variable power splitting ratio. The thermally variable power splitting ratio and the optical path length difference are selected so as to offset a thermal variation of a spectral gain profile of an optical amplifier.

20 Claims, 11 Drawing Sheets

REDUCING THERMAL DEPENDENCE OF AMPLIFIER GAIN

CROSS-REFERENCE TO RELATED APPLICATIONS

The present invention claims priority from U.S. Provisional Patent Application No. 61/870,248 filed Aug. 27, 2013, which is incorporated herein by reference.

TECHNICAL FIELD

The present invention relates to optical amplifier equipment, and in particular to devices and methods for spectral control of optical amplification.

BACKGROUND OF THE INVENTION

In a wavelength division multiplexing (WDM) optical transmission system, optical signals at different wavelengths are encoded with digital streams of information. These "wavelength channels" are combined together and transmitted through a series of spans of optical fiber. At a receiver end of a transmission link, the wavelength channels are separated, and each wavelength channel is individually detected.

While propagating through an optical fiber, light becomes attenuated. Yet some minimal level of optical power is required at the receiver end to decode information that has been encoded at the transmitter end. To boost optical signals propagating in an optical fiber, optical amplifiers are deployed throughout the transmission link. Optical amplifiers extend a maximum length of the link, in some instances, from a few hundred kilometers to several thousand kilometers, by amplifying optical signals to power levels close to the original levels of optical power.

A spectral gain profile is an important characteristic of an optical amplifier. It is desired to have a flat spectral gain profile, so that all wavelength channels are amplified similarly. Since an inherent gain profile of most optical amplifiers is not flat, gain flattening optical filters (GFFs) are often employed which attenuate gain peak or peaks of an optical amplifier, typically achieving a spectral flatness of approximately ±0.5 dB. However, the gain profile of many amplifiers, particularly an erbium doped fiber amplifier (EDFA), is dependent on temperature, so a good spectral flatness is only achievable in a narrow temperature range. To keep the gain profile flat at a wide range of ambient temperatures, the thermal dependence of an optical amplifier gain needs to be reduced or externally compensated.

Figure 1:
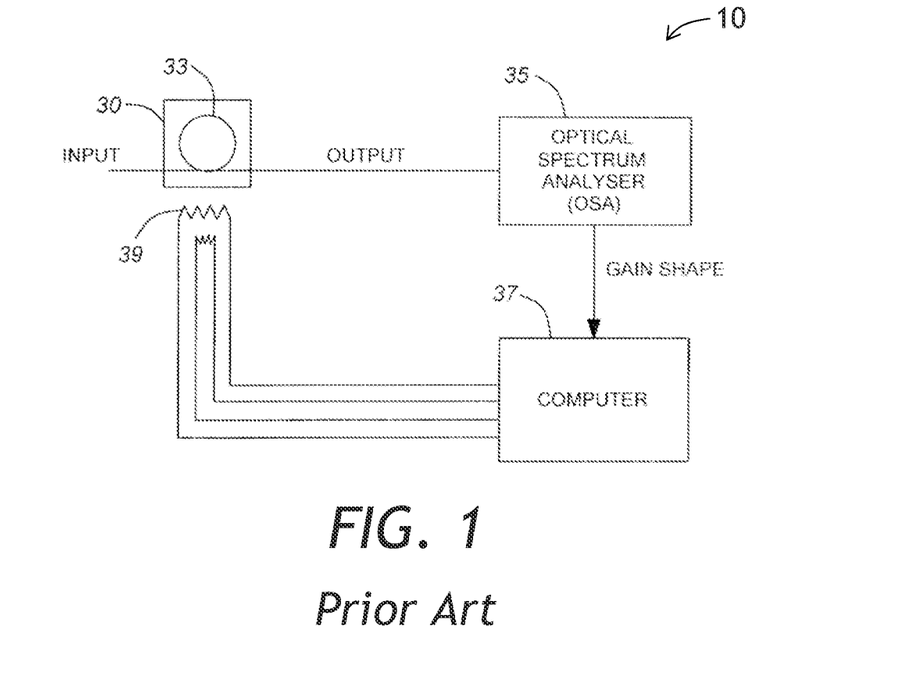
FIG. 1 is a block diagram of a prior-art system for thermally stabilizing an EDFA gain profile.

One method to reduce thermally induced EDFA gain variations is to thermally stabilize the active optical fiber of EDFA, that is, the erbium doped fiber (EDF). By way of example, Pelard et al. in U.S. Pat. No. 6,535,329 disclose stabilizing a spool of EDF by heating the EDF spool to an elevated temperature and providing an optical feedback loop by measuring optical spectrum of optical signal amplified by the EDFA. Referring to FIG. 1, a Pelard apparatus 10 includes an EDF spool 33 in a package 30, an optical spectrum analyzer (OSA) 35, a computer 37, and a heating element 39. In operation, a portion of an output optical signal amplified in the EDF spool 33 is coupled to the OSA 35, which measures a spectrum of the amplified optical signal to obtain a "gain shape". The computer 37 evaluates the spectral flatness of the gain shape, and provides a feedback control signal for the heating element 39 to heat the package 30, so as to preserve the spectral flatness.

Similarly, Flintham et al. in European Patent Application EP 1,246,322 disclose heating an EDF spool to reduce a gain deviation of an EDFA. Detrimentally, heating EDF to elevated temperatures may consume large amounts of energy and requires an extra space for thermal insulation of the EDF spool.

Chen et al. in U.S. Patent Application Publication 2002/0109907 disclose a dynamic compensator of thermally induced EDF gain variation including a fiber Bragg grating (FBG) having a thermally sensitive overcladding. When temperature of the FBG is tuned, an amplitude of the Bragg grating reflection peak changes. By properly selecting a spectral shape of the transmission peak in relation to the EDF gain profile, a certain degree of thermal stabilization of EDFA gain profile may be achieved. Unfortunately, FBG-based gain stabilizers are rather expensive, and require sophisticated active control.

SUMMARY OF THE INVENTION

It is an object of the invention to alleviate at least some of deficiencies of the prior art.

In accordance with the invention, an optical signal is split in two sub-beams with a splitting ratio dependent on temperature. One sub-beam travels a longer optical path length than the other. When the two sub-beams are recombined, they interfere with each other, causing the throughput to be wavelength dependent. An amplitude of this wavelength dependence is thermally variable due to the thermally variable power splitting ratio. The power splitting ratio and the optical path length difference may be selected so as to offset, at least partially, a thermal variation of a spectral gain profile of an optical amplifier amplifying the optical signal.

In accordance with an aspect of the invention, there is provided an apparatus for reducing a thermal dependence of gain of an optical amplifier, the apparatus comprising:

an input port for inputting an input optical beam;

a variable beam splitter optically coupled to the input port and configured for splitting the input optical beam into first and second sub-beams, the variable beam splitter having a power splitting ratio dependent on temperature;

first and second optical paths for propagating the first and second sub-beams, respectively, the first and second optical paths having an optical path length difference therebetween;

a beam combiner coupled to the first and second optical paths, for combining the first and second sub-beams propagated through the first and second optical paths, respectively, into an output optical beam, wherein a coupling efficiency of the first and second sub-beams into the output optical beam has a wavelength dependence due to the optical path length difference; and an output port optically coupled to the beam combiner for outputting the output optical beam;

wherein an amplitude of the wavelength dependence is dependent on the power splitting ratio and thereby has a dependence on the temperature, wherein in operation, the thermal dependence of gain of the optical amplifier is lessened by the dependence of the amplitude on the temperature.

In one embodiment, the variable beam splitter comprises a tuning element having a length or a refractive index dependent on the temperature, whereby the power splitting ratio of the variable beam splitter is dependent on the temperature. The tuning element is preferably passive, that is, it does not require electrical power to operate. By way of a non-limiting example, a thermally expandable block supporting a slab of optically transparent material may be used to translate the slab in an input optical beam.

In accordance with the invention, there is further provided an amplifying module comprising the apparatus as described above, serially optically coupled to the optical amplifier amplifying the input or output optical beam.

In accordance with another aspect of the invention, there is further provided a method for reducing a thermal dependence of gain of an optical amplifier, the method comprising:

(a) directing an input optical beam onto a variable beam splitter to split the input optical beam into first and second sub-beams with a power splitting ratio dependent on temperature;

(b) propagating the first and second sub-beams along first and second optical paths, respectively, the first and second optical paths having an optical path length difference therebetween;

(c) directing the first and second sub-beams propagated along the first and second optical paths, respectively, onto a beam combiner to combine the first and second sub-beams into an output optical beam, wherein a coupling efficiency of the first and second sub-beams into the output optical beam has a wavelength dependence due to the optical path length difference;

wherein an amplitude of the wavelength dependence is dependent on the power splitting ratio and thereby has a dependence on the temperature, wherein the thermal dependence of gain of the optical amplifier is lessened by the dependence of the amplitude on the temperature.

BRIEF DESCRIPTION OF THE DRAWINGS

Exemplary embodiments will now be described in conjunction with the drawings, in which.

DETAILED DESCRIPTION OF THE INVENTION

While the present teachings are described in conjunction with various embodiments and examples, it is not intended that the present teachings be limited to such embodiments. On the contrary, the present teachings encompass various alternatives and equivalents, as will be appreciated by those of skill in the art. In FIGS. 2, 6A to 6C, and FIG. 7 to FIG. 13, similar reference numerals denote similar elements.

Figure 2:
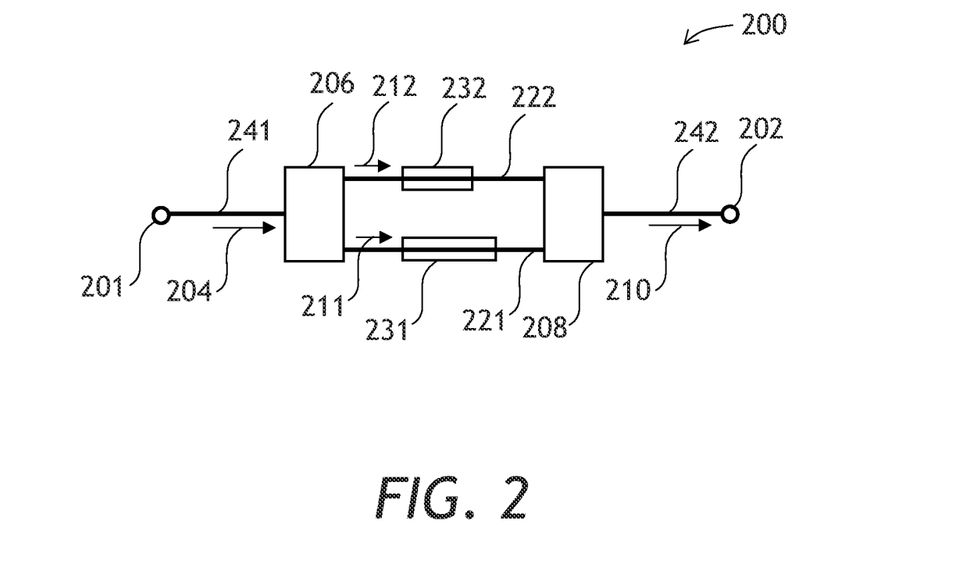
FIG. 2 is a block diagram of an apparatus for reducing a thermal dependence of gain of an optical amplifier according to one embodiment of the invention.

Referring to FIG. 2, an apparatus 200 of the invention for reducing a thermal dependence of gain of an optical amplifier includes an input port 201 for inputting an input optical beam 204, which may propagate in an optional input optical fiber 241, or alternatively in free space. A variable beam splitter 206 is optically coupled to the input port 201 and configured for splitting the input optical beam 204 into first 211 and second 212 sub-beams. The variable beam splitter 206 has an optical power splitting ratio dependent on temperature. In other words, the ratio of optical power levels of the first 211 and second 212 sub-beams is temperature dependent. Exemplary embodiments of the variable beam splitter 206 will be given further below.

The first 211 and second 212 sub-beams propagate along first 221 and second 222 optical paths, respectively. The first 221 and second 222 optical paths have an optical path length difference between them. To that end, the first 221 and second 222 optical paths may include first 231 and second 232 blocks of transparent material of different lengths and/or refractive indices. At least one block, slab, film, etc. of a transparent material may be placed in only one of the optical paths 221 and 222, to create the required optical path difference.

A beam combiner 208 is coupled to the first 221 and second 222 optical paths. The function of the beam combiner 208 is to combine the first 211 and second 212 sub-beams propagated through the first 221 and second 222 optical paths 222, respectively, into an output optical beam 210. The coupling efficiency of the first 211 and second 212 sub-beams into the output optical beam 210 has a wavelength dependence due to the optical path length difference between the first 221 and second 222 optical paths. The output optical beam 210 exits the apparatus 200 at an output port 202 e.g. coupled to the beam combiner 208 by an optional output optical fiber 242.

Figure 3A:
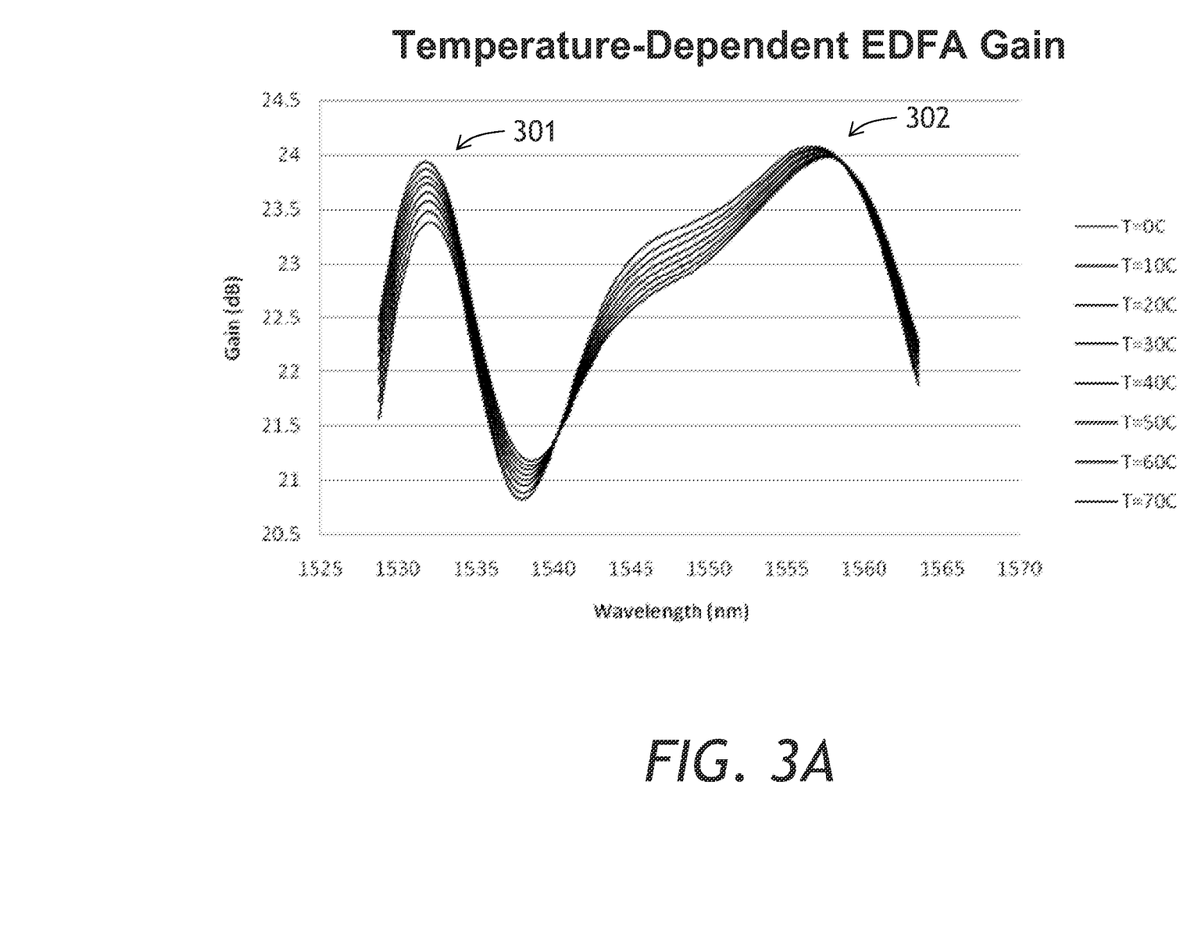
FIGS. 3A and 3B are gain profiles of unflattened (FIG. 3A) and flattened (FIG. 3B) EDFA at temperatures varying from 0° C. to 70° C.
Figure 3B:
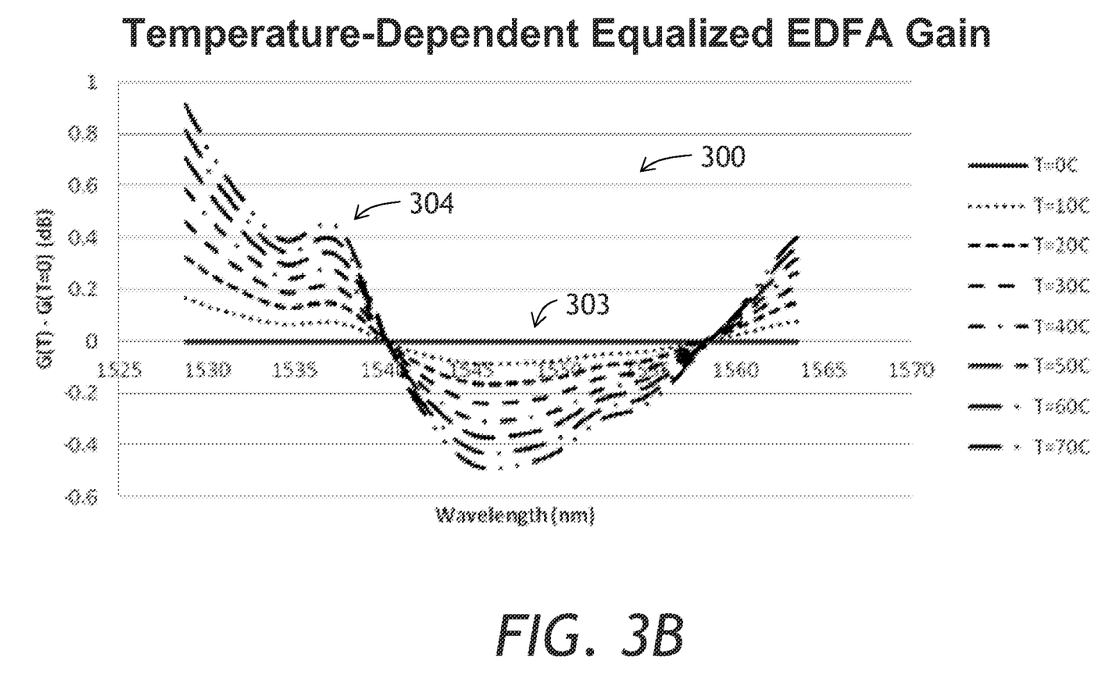

To understand how the apparatus 200 can reduce thermal dependence of gain of an optical amplifier, one may consider a typical amplifier gain variation with temperature. Referring to FIG. 3A, an EDFA gain is depicted as a function of wavelength for eight temperature values ranging from 0° C. to 70° C., with a 10° C. interval. One can see that temperature change causes a rather complex transformation of gain peaks 301 and 302, including peak wavelength shift, peak amplitude change, and even a shape change of the right-hand peak 302. In FIG. 3B, an equalized EDFA gain 300, e.g. using a GFF, is depicted at same temperature conditions. One can see that changes of equalized EDFA gain appear somewhat simpler, having approximately a V shape centered around a location 303 with a ripple appearing at 304, the amplitude of the V shape changing with temperature.

Figure 4:
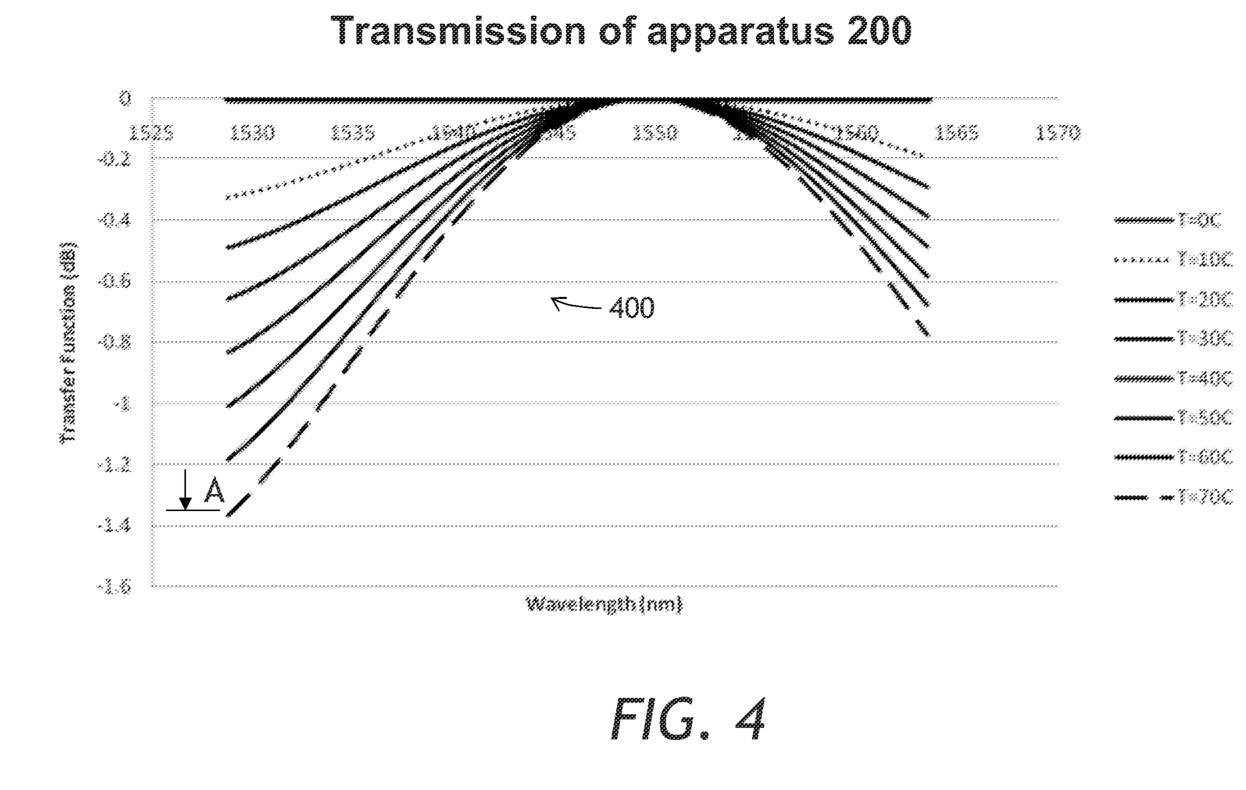
FIG. 4 is a throughput wavelength dependence of an apparatus of FIG. 2 at temperatures varying from 0° C. to 70° C.

Referring now to FIG. 4 with further reference to FIGS. 2 and 3B, the variable beam splitter 206, the first 221 and second 222 optical paths, and the beam combiner 208 (FIG. 2) form a Mach-Zehnder interferometer having a bell-shaped wavelength-dependent transmission function 400 due to interference of the first 211 and second 212 sub-beams. An amplitude A of the bell-shaped wavelength dependent transmission function 400 is dependent on the power splitting ratio of the variable beam splitter 206. Since the power splitting ratio depends on the temperature, the amplitude A is dependent on the temperature, as shown in FIG. 4. The transmission function 400 can be represented by the following equation:

$$R(T, \lambda) = r^2 + (1-r)^2 + 2r(1-r)\cos\left(2\pi \frac{OPD}{\lambda}\right) \quad (1)$$

where $R(T,\lambda)$ represents the transmission function 400 dependent on temperature T and wavelength $\lambda$, OPD is the optical path length difference between the first 221 and second 222 optical paths, and $r=r(T)$ is a temperature dependent power splitting ratio of the variable beam splitter 206. The optical power in the first sub-beam 211 is $$P_1 = rP_{in} \quad (2)$$

and the optical power in the second sub-beam 212 is $$P_2 = (1-r)P_{in} \quad (3)$$

where $P_{in}$ is the optical power of the input optical beam 204, not counting optical losses in the variable beam splitter 206.

Figure 5:
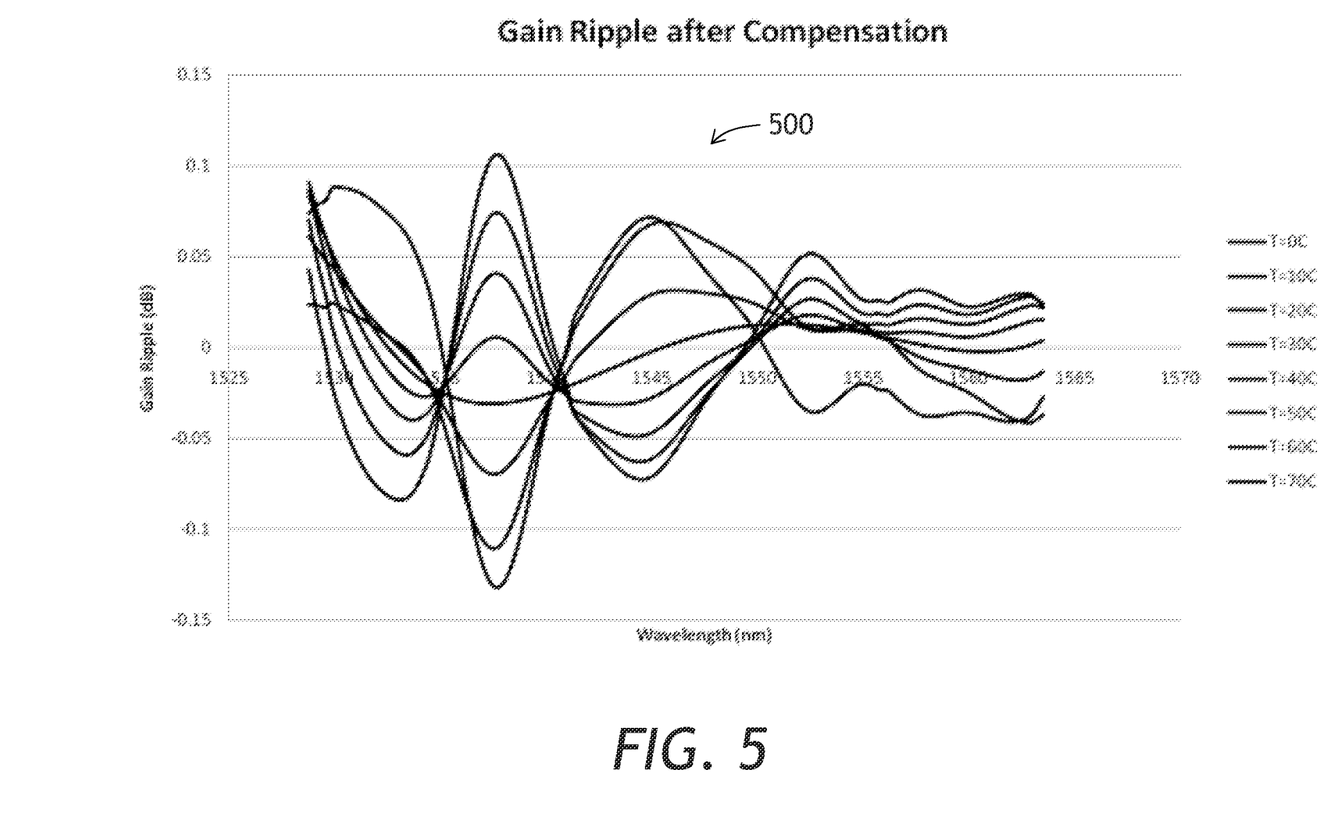
FIG. 5 is a simulated difference between the gain profile of FIG. 3B and the wavelength dependence of FIG. 4 at temperatures varying from 0° C. to 70° C.

According to the invention, the OPD value and the function r(T) in Eq. (1) above are selected so as to lessen the thermal dependence of gain of the optical amplifier by the dependence of the amplitude A on the temperature. The V-shaped gain 300 (FIG. 3B) of the equalized EDFA gain may be lessened by the bell-shaped wavelength-dependent transmission function 400 (FIG. 4) of the apparatus 200 (FIG. 2). An example of such a compensation is shown in FIG. 5, where the transmission function 400 is subtracted from the V-shaped equalized gain spectrum 300 of FIG. 3B. The amplitude A has been adjusted for each temperature between 0° C. to 70° C. One can see that the resulting spectral ripple 500 is rather small, less than +-0.15 dB, across the temperature range of between 0° C. to 70° C. In the simulation of FIG. 5, r=0 at 0° C., and r≈0.08 at 70° C.; and the OPD is about 45 micrometers for C-band; and 48 micrometers for L-band. These values of the OPD between the first 221 and second 222 optical paths are only examples meant for illustration of required material thicknesses and distances. For instance, when the first 231 and second 232 blocks are made out of fused silica having a refractive index of 1.44 at a C-band wavelength of 1.45 micrometers, the first 231 and second 232 blocks have a length difference 45/(1.44−1.0)=102.3 micrometers. More generally, the OPD may be selected so that the transmission function 400 of FIG. 4, which represents the wavelength dependence of the coupling efficiency of the first 211 and second 212 sub-beams into the output optical beam 210, has a period of at least 40 nm.

Figure 6A:
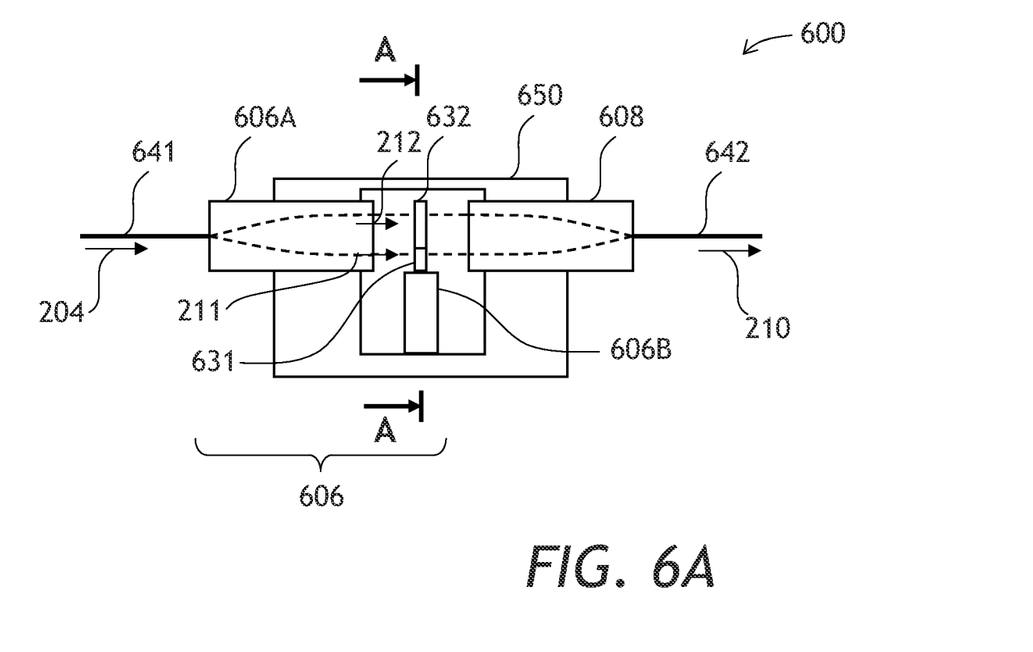
FIG. 6A is a plan cross-sectional view of one embodiment of the apparatus of FIG. 2.
Figure 6B:
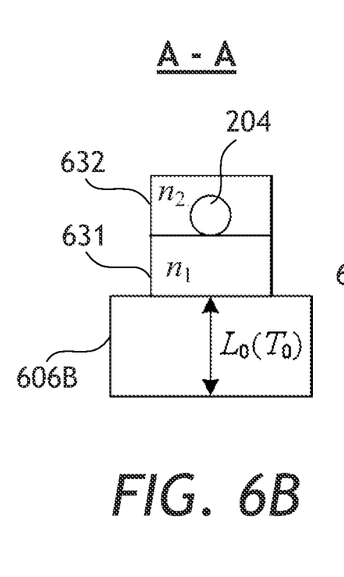
FIGS. 6B and 6C are side cross-sectional views of the embodiment of FIG. 6A taken along line A-A at two different ambient temperatures.
Figure 6C:
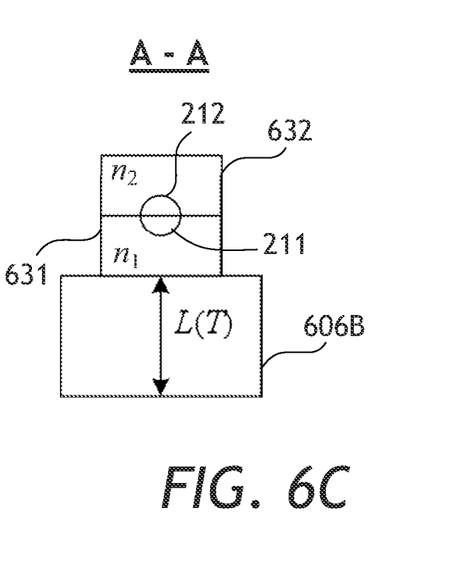

Exemplary implementations of the apparatus 200 of FIG. 2 will now be considered in detail. Referring to FIGS. 6A to 6C, an apparatus 600 (FIG. 6A) includes first 606A and second 608 collimator lenses fixed within a housing 650. Also fixed within the housing 650 is a block 606B supporting first 631 and second 632 adjacent slabs of a same or different optical materials. The block 606B has a non-zero thermal expansion coefficient, causing the block 606B to expand and contract with temperature.

The first 631 and the second 632 slabs have different optical path lengths. For example, the first 631 and the second 632 slabs can have a different physical thickness and be made out of a same material, or the first 631 and the second 632 slabs can have a same physical thickness and be made out of different materials, or both. It is also possible that one of the slabs 631 and 632 is omitted entirely. In the latter case, only one of the first and second sub-beams propagates in the present slab, e.g. only the first sub-beam 211 propagates in the first slab 631, and the other sub-beam 212 propagates in air above the first slab 631. Since the required thickness is typically quite small e.g. ≤0.1 mm, a thin optical film may be used in place of the single slab 632 or 631.

In operation, the input optical beam 204 propagating in an input optical fiber 641 is collimated by the first collimator lens 606A and is directed towards the first 631 and second 632 slabs. The first collimator lens 606A and the block 606B together form a temperature-variable beam splitter 606. At a low temperature $T_0$, the block 606B is contracted as shown in FIG. 6B, so that the input optical beam 204 propagates entirely in the second slab 632, as shown in FIG. 6B. At a higher temperature $T>T_0$, the block 606B expands, pushing the first slab 631 into the input optical beam 204, thereby causing the input optical beam 204 to propagate partially in the first slab 631 as the first sub-beam 211 and partially in the second slab 632 as the second sub-beam 212, as shown in FIG. 6C. The second collimator lens 608 effectively functions as a beam combiner, combining the first 211 and second 212 sub-beams into the output optical beam 210.

Due to the length L of the block 606B being dependent on the temperature T, when the temperature T changes, the block 606B moves the first 631 and second 632 slabs across the input optical beam 204, changing the power splitting ratio r(T) of the first 211 and second 212 sub-beams. The changing power splitting ratio r(T) causes the amplitude of the wavelength dependence to vary according to Eq. (1); as a result, the thermal dependence of gain of the optical amplifier, optically coupled in series with the apparatus 600, is lessened.

The tuning element, e.g. the block 606B, is preferably passive, that is, not requiring electrical power to operate; however, the tuning element may also be active, e.g. extending or contracting in response to an electrical control signal generated depending on a measured ambient temperature. The active control may provide a greater flexibility in temperature control. Collimator lenses 606A and 608 are optional and may be replaced by other optical elements for re-focusing optical beams between the input 641 and output 642 optical fibers, or may be omitted for free space propagating collimated optical beams 641 and 642.

Figure 7:
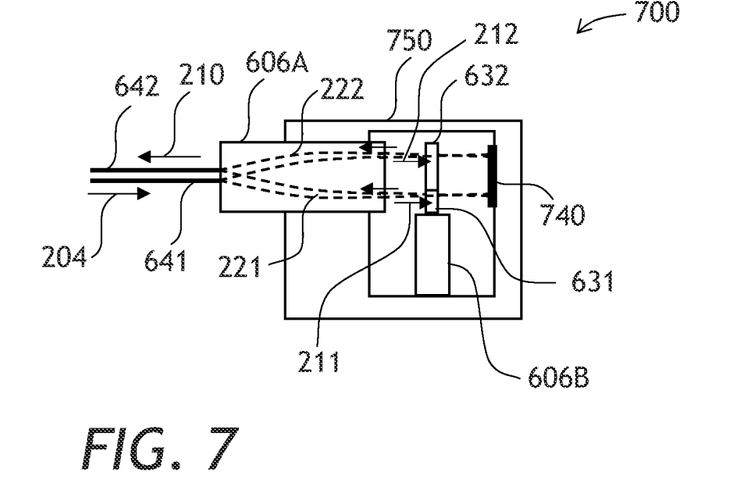
FIG. 7 is a plan view of a double-pass apparatus of the invention.

Referring now to FIG. 7, an apparatus 700 for reducing a thermal dependence of gain of an optical amplifier is a reflective variant of the apparatus 600 of FIG. 6. The apparatus 700 of FIG. 7 includes a mirror 740 disposed in the first 221 and second 222 optical paths, for reflecting the first 211 and second 212 sub-beams to propagate back through the respective first 221 and second 222 optical paths. The first collimator lens 606A disposed in a housing 750 has a triple function: first, as a collimator of the input optical beam 204; second, as a part of the variable beam splitter 606 (FIG. 6); and third, as a beam combiner for coupling the output optical beam 210 into the output optical fiber 642. One advantage of the apparatus 700 of FIG. 7 is compactness. The input 641 and output 642 optical fibers of the apparatus 700 are disposed on a same end of the housing 750, which may be beneficial for fiber routing purposes.

Figure 8:
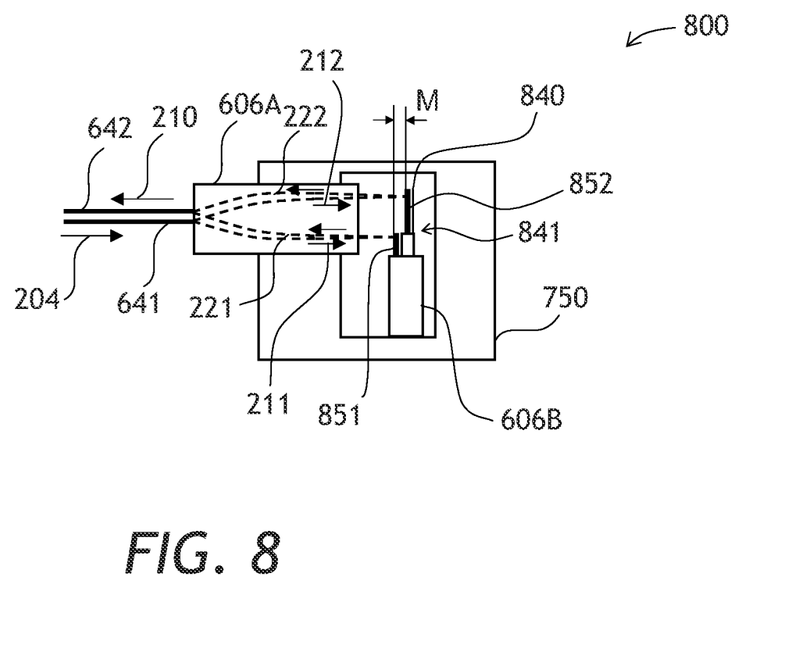
FIG. 8 is a plan view of a double-pass apparatus of the invention having a stepped mirror.

Turning to FIG. 8, an apparatus 800 for reducing a thermal dependence of gain of an optical amplifier is a reflective embodiment of the apparatus 200 of FIG. 2, similar to the apparatus 700 of FIG. 7. One difference of the apparatus 800 of FIG. 8 is that the first slab 631, the second slab 632, and the mirror 740 are omitted. Instead, a stepped mirror 840 is disposed in the first 221 and second 222 optical paths. In operation, the stepped mirror reflects the first 211 and second 212 sub-beams to propagate back through the first 221 and second optical paths 222, respectively. The stepped mirror 840 has a step 841 having a top portion 851 and a bottom portion 852 for reflecting the first 211 and second 212 sub-beams respectively. In this embodiment, the optical path length difference OPD is proportional to a magnitude M of the step 841. In air, the optical path length difference OPD is approximately equal to 2M.

Figure 9:
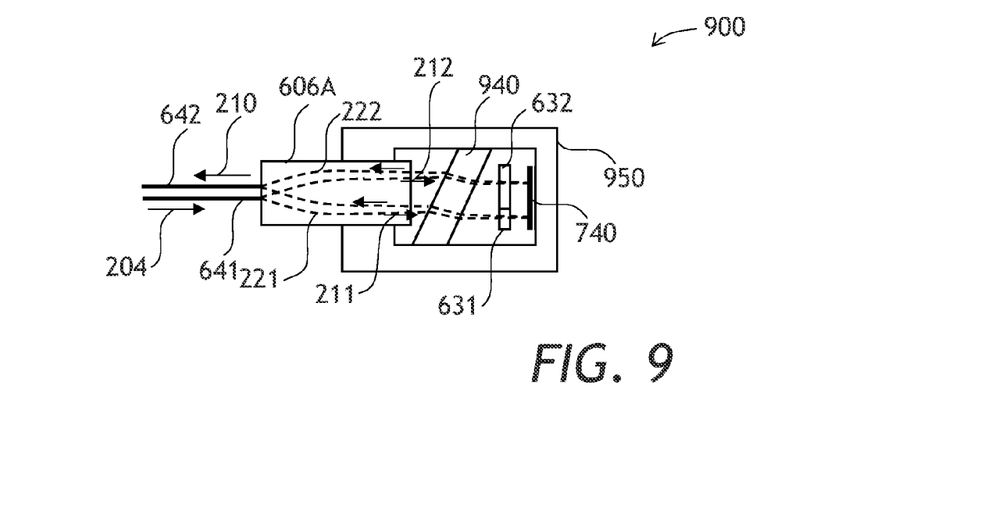
FIG. 9 is a plan view of a double-pass apparatus of the invention having a thermally tuned slab of a transparent material.

Referring to FIG. 9, an apparatus 900 for reducing a thermal dependence of gain of an optical amplifier is another reflective embodiment of the apparatus 200 of FIG. 2, and is similar to the apparatus 700 of FIG. 7. The apparatus 900 of FIG. 9 includes a passive tuning element 940 affixed within a package 950. The tuning slab 940 has the refractive index dependent on the temperature, and is shaped and disposed such that when the temperature changes, the input optical beam 204 moves across the first 631 and the second 632 slabs, thereby changing the power splitting ratio of the input optical beam 204 into the first 211 and second 212 sub-beams. In the embodiment shown in FIG. 9, the tuning slab 940 has a plano-parallel shape, and is disposed at an acute angle to the input optical beam 204. Other shapes of the tuning slab 940 are possible, e.g. a prismatic shape. Furthermore, just like in the apparatus 700 of FIG. 7, the first 631 and the second 632 slabs may be replaced with a single transparent plate, film, or slab, so that in operation, only one of the first and second sub-beams propagates in the single plate, film, or slab.

Figure 10:
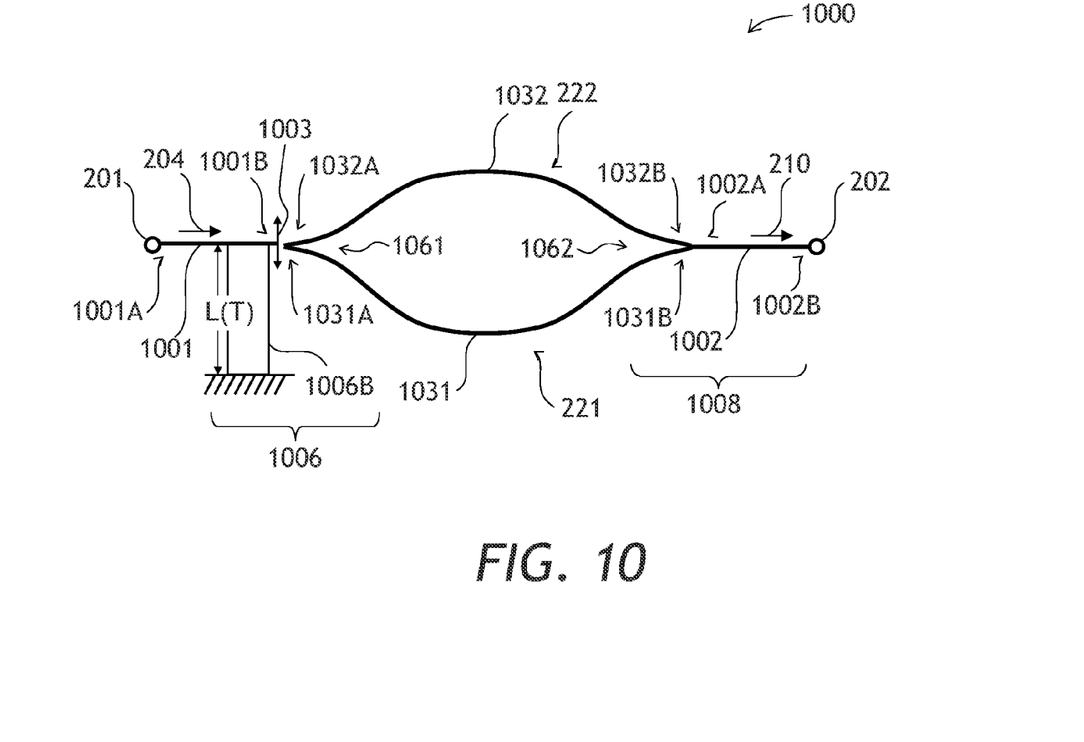
FIG. 10 is a plan view of a waveguide embodiment of an apparatus of the invention having a movable input waveguide.

Turning now to FIG. 10, an apparatus 1000 for reducing a thermal dependence of gain of an optical amplifier is a waveguide embodiment of the apparatus 200 of FIG. 2. In the apparatus 1000 of FIG. 10, the first 221 and second 222 optical paths are defined by first 1031 and second 1032 optical waveguides, respectively. The first 1031 and second 1032 optical waveguides have different lengths between their respective first 1031A, 1032A and second 1031B, 1032B opposed ends. A variable beam splitter 1006 of the apparatus 1000 includes an input waveguide 1001 having opposed first 1001A and second 1001B ends. The input waveguide 1001 is coupled at its first end 1001A to the input port 201. At its second end 1001B, the input waveguide 1001 forms a first Y-coupler 1061 with the first ends 1031A, 1032A of the first 1031 and second 1032 optical waveguides, respectively.

The second end 1001B of the input waveguide 1001 is supported by a block 1006B having a length L dependent on the temperature T and disposed such that when the temperature T changes, the second end 1001B of the input waveguide 1001 moves along an arrow 1003 with respect to the first ends 1031A, 1032A of the first 1031 and second 1032 optical waveguides, thereby changing the power splitting ratio.

A beam combiner 1008 includes an output optical waveguide 1002 having opposed first 1002A and second 1002B ends. The output waveguide 1002 forms at its first end 1002A a second Y-coupler 1062 with the second ends 1031B, 1032B of the first 1031 and second 1032 optical waveguides. The output optical waveguide 1002 is coupled at its second end 1002B to the output port 202.

Figure 11:
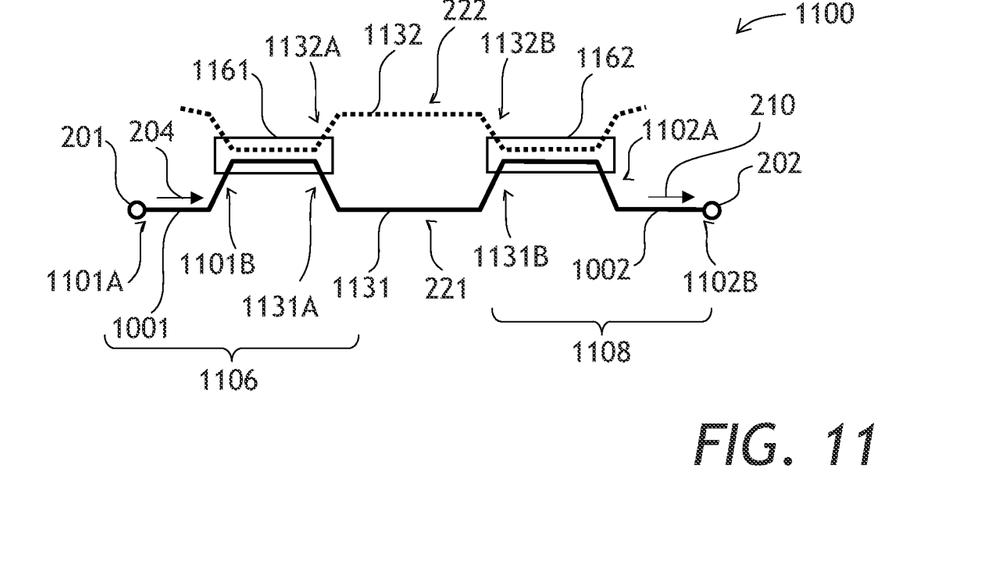
FIG. 11 is a plan view of a polymer waveguide embodiment of an apparatus of the invention.

Turning to FIG. 11, an apparatus 1100 for reducing a thermal dependence of gain of an optical amplifier is a polymer waveguide embodiment of the apparatus 200 of FIG. 2. In the apparatus 1100 of FIG. 11, the first 221 and second 222 optical paths are defined by first 1131 and second 1132 optical polymer waveguides, respectively. The first 1131 and second 1132 optical polymer waveguides have different lengths between their respective first 1131A, 1132A and second 1131B, 1132B opposed ends. A variable beam splitter 1106 of the apparatus 1100 comprises an input optical polymer waveguide 1101 having opposed first 1101A and second 1101B ends. The input polymer optical waveguide 1101 is coupled at its first end 1101A to the input port 201. At its second end 1101B, the input optical polymer waveguide 1101 forms a first coupler 1161 with the first ends 1131A, 1132A of the first 1131 and second 1132 optical polymer waveguides, respectively. An optical coupling ratio of the first coupler 1161 depends on the temperature due to a temperature dependence of the polymer's refractive index. Due to this temperature dependence, the power splitting ratio of the variable beam splitter 1161 depends on the temperature.

A beam combiner 1108 of the apparatus 1100 includes an output optical polymer waveguide 1102 having opposed first 1102A and second 1102B ends. The output optical polymer waveguide 1102 forms at its first end 1102A a second coupler 1162 with the second ends 1131B, 1132B of the first 1131 and second 1132 optical waveguides. The output optical polymer waveguide 1102 coupled at its second end 1102B to the output port 202.

Figure 12:
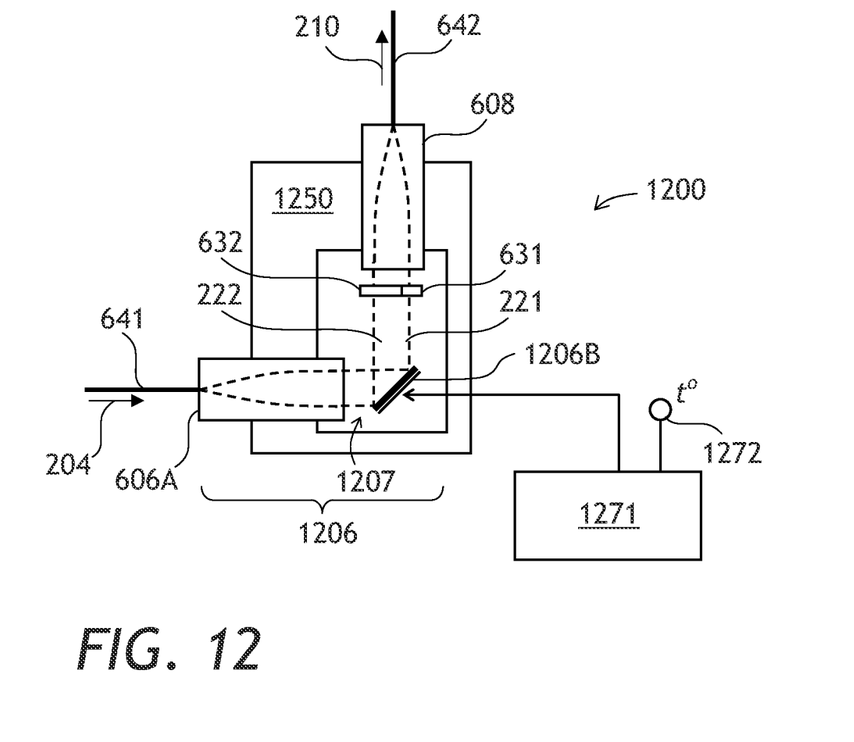
FIG. 12 is a plan view of an apparatus of the invention, having a tiltable MEMS mirror.

Referring now to FIG. 12, an apparatus 1200 for reducing a thermal dependence of gain of an optical amplifier is an "active" embodiment of the apparatus 200 of FIG. 2, and is somewhat similar to the apparatus 600 of FIG. 6. The apparatus 1200 of FIG. 12 includes the input 641 and output 642 optical fibers coupled to the first 606A and second 608 collimator lenses, respectively, affixed within a body 1250. The first 221 and second 222 optical paths of the apparatus 1200 of FIG. 12 include the first 631 and second 632 slabs of optically transparent material, respectively, disposed partially in the input optical beam 204 collimated by a first collimator lens 606A.

An active tuning element 1206 includes the first collimator lens 606A and a tiltable micro-electro-mechanical system (MEMS) mirror 1206B disposed in an optical path 1207 between the first collimator lens 606A and the first 631 and second 632 slabs and configured to reflect the input optical beam 204 towards the first 631 and second 632 slabs. A controller 1271 is operationally coupled to the MEMS mirror 1206B and is configured to change an angle of tilt of the MEMS mirror 1206B upon change of the temperature detected by a temperature sensor 1272 coupled to the controller 1271, thereby changing the power splitting ratio of the first 211 and second 212 sub-beams, which are combined by the second collimator lens 608. It is also possible that the second slab 632 is omitted entirely. For this case, only the first sub-beam 211 propagates in the singular first slab, plate, or film 631, and the second sub-beam 212 propagates in air proximate the first slab, plate, or film 631.

Referring back to FIG. 6A, an "active" embodiment of the apparatus 600 may include a linear translator in place of the block 606B. The linear translator may be energized by an electrical signal provided by a controller similar to the controller 1271 of FIG. 12. In operation, the linear translator moves the first 631 and second 632 slabs across the input optical beam 204 upon change of the temperature detected by a temperature sensor (not shown in FIG. 6A), thereby changing the power splitting ratio.

Figure 13:
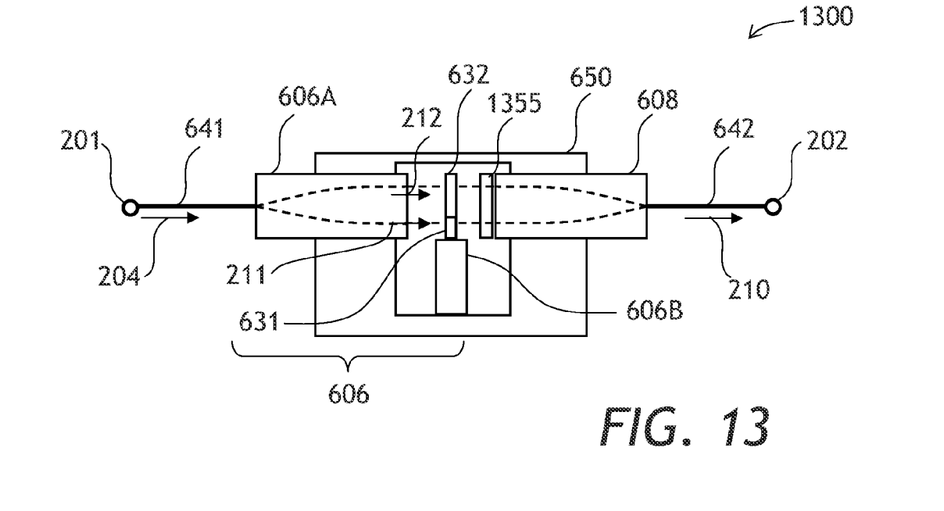
FIG. 13 is a plan view of an embodiment of the invention including a GFF.

Turning to FIG. 13, an apparatus 1300 for reducing a thermal dependence of gain of an optical amplifier is a preferred embodiment of the apparatus 600 of FIG. 6. The apparatus 1300 further includes a gain flattening optical filter (GFF) 1355 for flattening a gain profile of an optical amplifier, not shown. Although the GFF 1355 is shown attached to the second collimator lens 608, it may be disposed anywhere in an optical path between the input 201 and output 202 optical ports. The GFF 1355 may also be disposed in an optical path of the reflective embodiments 700 of FIG. 7, 800 of FIGS. 8, and 900 of FIG. 9 of the apparatus 200 of FIG. 2.

Figure 14A:
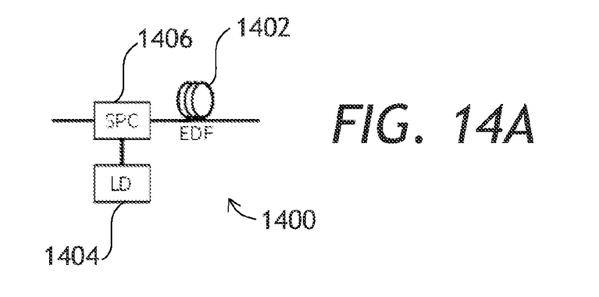
FIG. 14A is a schematic view of a single-stage EDFA.
Figure 14B:
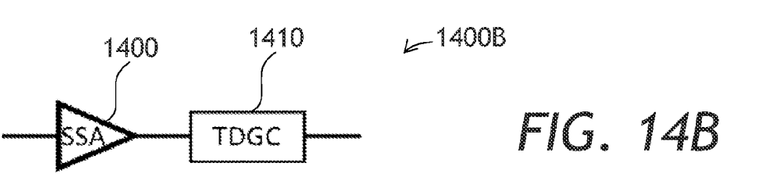
FIG. 14B is a schematic view of the single-stage EDFA of FIG. 14A coupled to an apparatus of the invention.

Referring to FIGS. 14A to 14E, a typical placement of the apparatuses 200, 600, 700, 800, 900, 1000, 1100, 1200, and 1300 of FIGS. 2, 6A, 7, 8, 9, 10, 11, 12, and 13, respectively, in optical amplifier systems is illustrated. Referring first to FIG. 14A, a single stage optical amplifier (SSA) 1400 typically includes an EDF spool 1402 a pump laser diode 1404 coupled to the EDF spool 1402 by a pump coupler 1406. Turning to FIG. 14B, an optical amplifying module 1400B includes a "temperature dependent gain compensator" (TDGC) 1410 serially optically coupled to the SSA 1400. Variants of the TDGC 1410 shown in FIGS. 14B to 14E include, without limitation, the apparatus embodiments 200, 600, 700, 800, 900, 1000, 1100, 1200, and 1300 of FIGS. 2, 6A, 7, 8, 9, 10, 11, 12, and 13, respectively.

Figure 14C:
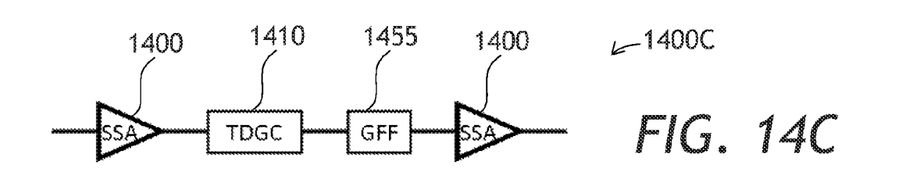
FIG. 14C is a schematic view of a dual-stage EDFA coupled to an apparatus of the invention.
Figure 14D:
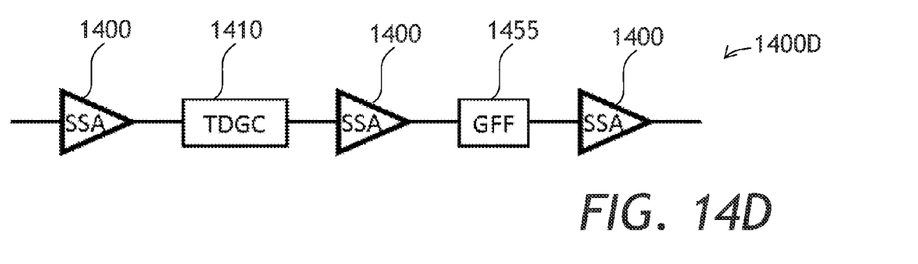
FIGS. 14D and 14E are schematic views of a triple-stage EDFA coupled to an apparatus of the invention.
Figure 14E:
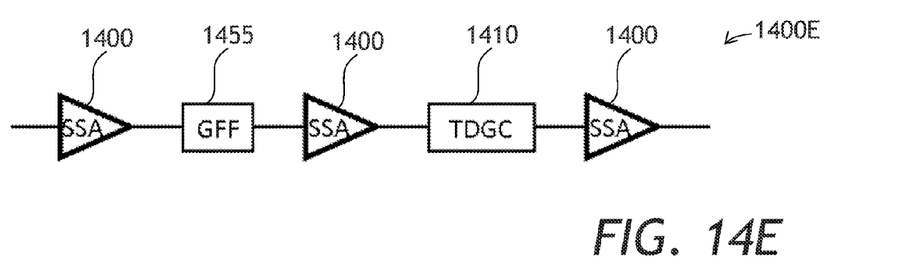

Referring to FIG. 14C, an optical amplifier module 1400C includes two SSA 1400, one TDGC 1410, and an external GFF 1455 connected in series between the two SSA 1400. Turning to FIG. 14D, an optical amplifier module 1400D includes three SSA 1400, one TDGC 1410, and one external GFF 1455 connected in series. The positions of the TDGC 1410 and the GFF 1455 may be reversed as shown in an optical amplifier module 1400E of FIG. 14E.

Figure 15:
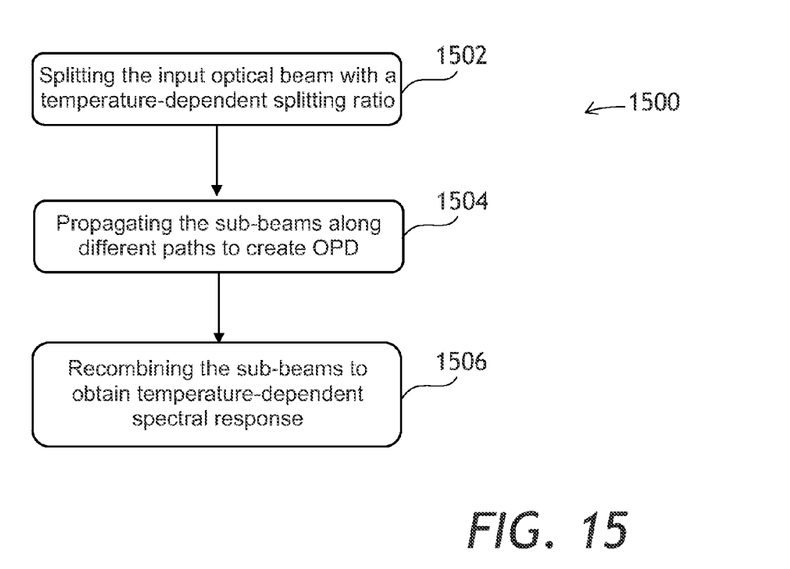
FIG. 15 is a flow chart of a method of the invention for reducing a thermal dependence of gain of an optical amplifier.

Turning now to FIG. 15, a method 1500 of the invention for reducing a thermal dependence of gain of an optical amplifier, e.g. the SSA 1400 of FIG. 14, includes a step 1502 of directing the input optical beam 204 onto a variable beam splitter e.g. the variable beam splitter 206 of the apparatus 200 of FIG. 2, to split the input optical beam 204 into the first 211 and second 212 sub-beams with a power splitting ratio dependent on temperature. In a step 1504, the first 211 and second 212 sub-beams propagate along the first 221 and second 222 optical paths, respectively, the first 221 and second 222 optical paths having a non-zero OPD as explained above. Finally, in a step 1506, the first 211 and second 212 sub-beams propagated along the first 221 and second 222 optical paths, respectively, are directed onto a beam combiner e.g. the beam combiner 208 in the apparatus 200 of FIG. 2, to combine the first 211 and second 212 sub-beams into the output optical beam 210. The coupling efficiency of the first 211 and second 212 sub-beams into the output optical beam 210 has a wavelength dependence due to the non-zero OPD. The amplitude of the wavelength dependence is dependent on the power splitting ratio and thereby has a dependence on the temperature. As a result, the thermal dependence of gain of the optical amplifier is lessened by the dependence of the amplitude on the temperature.

In a preferred embodiment, the splitting step 1502 includes passively tuning the power splitting ratio using a tuning element having a length or a refractive index dependent on the temperature, the tuning element not requiring electrical power to operate. In one embodiment, the propagating step 1504 includes propagating only one of the first 211 and second 212 sub-beams in a slab partially disposed in the input optical beam 204, as explained above.

The hardware used to implement the various illustrative logics, logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Alternatively, some steps or methods may be performed by circuitry that is specific to a given function.

The foregoing description of one or more embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:

1. An apparatus for reducing a thermal dependence of gain of an optical amplifier, the apparatus comprising:
   an input port for inputting an input optical beam;
   a variable beam splitter optically coupled to the input port and configured for splitting the input optical beam into first and second sub-beams, the variable beam splitter having a power splitting ratio dependent on temperature;
   first and second optical paths for propagating the first and second sub-beams, respectively, the first and second optical paths having an optical path length difference therebetween;
   a beam combiner coupled to the first and second optical paths, for combining the first and second sub-beams propagated through the first and second optical paths, respectively, into an output optical beam,
   wherein a coupling efficiency of the first and second sub-beams into the output optical beam has a wavelength dependence due to the optical path length difference; and
   an output port optically coupled to the beam combiner for outputting the output optical beam;
   wherein an amplitude of the wavelength dependence is dependent on the power splitting ratio and thereby has a dependence on the temperature, wherein in operation, the thermal dependence of gain of the optical amplifier is lessened by the dependence of the amplitude on the temperature.

2. The apparatus of claim 1, wherein the variable beam splitter comprises a tuning element having a length or a refractive index dependent on the temperature, whereby the power splitting ratio of the variable beam splitter is dependent on the temperature.

3. The apparatus of claim 2, wherein the tuning element is a passive tuning element not requiring electrical power to operate.

4. The apparatus of claim 3, wherein at least one of the first and second optical paths comprises a first slab of an optically transparent material disposed partially in the input optical beam, so that in operation, only the first sub-beam propagates in the first slab, and wherein the tuning element comprises a block supporting the first slab, the block having a length dependent on the temperature and disposed such that when the temperature changes, the first slab moves across the input optical beam, thereby changing the power splitting ratio.

5. The apparatus of claim 4, further comprising a second slab adjacent the first slab, so that in operation, the second sub-beam propagates in the second slab, while the first sub-beam propagates in the first slab; and, as the first and second slabs move across the input optical beam, the power splitting ratio changes.

6. The apparatus of claim 4, wherein the variable beam splitter and the beam combiner comprise a common collimator lens, the apparatus further comprising a mirror for reflecting the first and second sub-beams to propagate back through the first and second optical paths, respectively.

7. The apparatus of claim 3, wherein the variable beam splitter and the beam combiner comprise a common collimator lens, the apparatus further comprising a stepped mirror for reflecting the first and second sub-beams to propagate back through the first and second optical paths, respectively, the stepped mirror having a step having top and bottom portions for reflecting the first and second sub-beams, respectively, wherein the optical path length difference is proportional to a magnitude of the step.

8. The apparatus of claim 3, wherein at least one of the first and second optical paths comprises a slab of an optically transparent material disposed partially in the input optical beam, so that in operation, only one of the first and second sub-beams propagates in the slab, and wherein the tuning element has the refractive index dependent on the temperature and is shaped and disposed such that when the temperature changes, the input optical beam moves across the slab, thereby changing the power splitting ratio.

9. The apparatus of claim 8, wherein the tuning element comprises a plano-parallel slab disposed at an acute angle to the input optical beam.

10. The apparatus of claim 3, wherein the first and second optical paths comprise first and second optical waveguides, respectively, of different lengths between respective opposed first and second ends thereof;
wherein the variable beam splitter comprises an input optical waveguide having opposed first and second ends and coupled at the first end thereof to the input port; and a first Y-coupler formed by the second end of the input optical waveguide and the first ends of the first and second optical waveguides; wherein the tuning element comprises a block supporting the second end of the input optical waveguide and having a length dependent on the temperature and disposed such that when the temperature changes, the second end of the input optical waveguide moves with respect to the first ends of the first and second optical waveguides, thereby changing the power splitting ratio; and
wherein the beam combiner comprises an output optical waveguide having opposed first and second ends and coupled at the second end thereof to the output port; and a second Y-coupler formed by the first end of the output optical waveguide and the second ends of the first and second optical waveguides.

11. The apparatus of claim 3, wherein the first and second optical paths comprise first and second optical polymer waveguides, respectively, each of the first and second optical polymer waveguides having opposed first and second ends;
wherein the variable beam splitter comprises an input optical polymer waveguide having opposed first and second ends and coupled at the first end thereof to the input port; and a first coupler formed by the second end of the input optical polymer waveguide and the first ends of the first and second optical polymer waveguides; wherein an optical coupling ratio of the first coupler depends on the temperature, whereby the power splitting ratio depends on the temperature; and
wherein the beam combiner comprises an output optical polymer waveguide having opposed first and second ends and coupled at the second end thereof to the output port; and a second coupler formed by the first end of the output optical polymer waveguide and the second ends of the first and second optical polymer waveguides.

12. The apparatus of claim 1, wherein the wavelength dependence has a period of at least 40 nm.

13. The apparatus of claim 1, wherein at least one of the first and second optical paths comprises a slab of optically transparent material disposed partially in the input optical beam, so that in operation, only one of the first and second sub-beams propagates in the slab, and wherein the tuning element comprises a linear translator supporting the slab;
the apparatus further comprising a controller and a temperature sensor coupled thereto, wherein the controller is operationally coupled to the linear translator for moving the slab across the input optical beam upon change of the temperature detected by the temperature sensor, thereby changing the power splitting ratio.

14. The apparatus of claim 1, wherein at least one of the first and second optical paths comprises a slab of optically transparent material disposed partially in the input optical beam, so that in operation, only one of the first and second sub-beams propagates in the slab, and wherein the tuning element comprises a MEMS mirror disposed in an optical path between the input port and the slab and configured to reflect the input optical beam towards the slab;
the apparatus further comprising a controller and a temperature sensor coupler thereto, wherein the controller is operationally coupled to the MEMS mirror for changing an angle of tilt of the MEMS mirror upon change of the temperature detected by the temperature sensor, thereby changing the power splitting ratio.

15. The apparatus of claim 1, further comprising a gain flattening optical filter for flattening a gain profile of the optical amplifier, wherein the gain flattening optical filter is disposed in an optical path between the input and output ports.

16. An amplifying module comprising the apparatus of claim 15 serially optically coupled to the optical amplifier.

17. An amplifying module comprising the apparatus of claim 1 serially optically coupled to the optical amplifier.

18. A method for reducing a thermal dependence of gain of an optical amplifier, the method comprising:
(a) directing an input optical beam onto a variable beam splitter to split the input optical beam into first and second sub-beams with a power splitting ratio dependent on temperature;
(b) propagating the first and second sub-beams along first and second optical paths, respectively, the first and second optical paths having an optical path length difference therebetween;
(c) directing the first and second sub-beams propagated along the first and second optical paths, respectively, onto a beam combiner to combine the first and second sub-beams into an output optical beam, wherein a coupling efficiency of the first and second sub-beams into the output optical beam has a wavelength dependence due to the optical path length difference;
wherein an amplitude of the wavelength dependence is dependent on the power splitting ratio and thereby has a dependence on the temperature, wherein the thermal dependence of gain of the optical amplifier is lessened by the dependence of the amplitude on the temperature.

19. The method of claim 18, wherein step (a) comprises passively tuning the power splitting ratio using a tuning element having a length or a refractive index dependent on the temperature, the tuning element not requiring electrical power to operate.

20. The method of claim 19, wherein step (b) comprises propagating only one of the first and second sub-beams in a slab partially disposed in the input optical beam.

* * * * *